US010436602B2

(12) United States Patent
Verheijen et al.

(10) Patent No.: US 10,436,602 B2
(45) Date of Patent: Oct. 8, 2019

(54) APPARATUS AND METHOD FOR PROVIDING OPTIMAL GEAR ADVICE

(71) Applicant: TomTom Telematics B.V., Amsterdam (NL)

(72) Inventors: Paul Roeland Verheijen, Heemstede (NL); Jasper Johannes Anthonius Pauwelussen, The Hague (NL); Christoph Ebert, Leipzig (DE); Steffen Orlowsky, Dessau-Roßlau (DE); Marco Leupold, Leipzig (DE); Lars Dietzel, Schkopau (DE)

(73) Assignee: TOMTOM TELEMATICS B.V., Amsterdam (NL)

( * ) Notice: Subject to any disclaimer, the term of this patent is extended or adjusted under 35 U.S.C. 154(b) by 0 days.

(21) Appl. No.: 15/528,767

(22) PCT Filed: Nov. 26, 2015

(86) PCT No.: PCT/EP2015/077830
§ 371 (c)(1),
(2) Date: May 23, 2017

(87) PCT Pub. No.: WO2016/083535
PCT Pub. Date: Jun. 2, 2016

(65) Prior Publication Data
US 2017/0314679 A1    Nov. 2, 2017

(30) Foreign Application Priority Data

Nov. 26, 2014  (GB) .................................... 1420988.6
Mar. 12, 2015  (GB) .................................... 1504227.8

(51) Int. Cl.
G01P 1/00      (2006.01)
G01C 21/36     (2006.01)
(Continued)

(52) U.S. Cl.
CPC .......... G01C 21/3697 (2013.01); B60K 31/00 (2013.01); B60R 16/0236 (2013.01);
(Continued)

(58) Field of Classification Search
CPC ............ B60K 31/00; B60K 2350/1092; B60Y 2300/52; G08G 1/0137; G08G 1/0967;
(Continued)

(56) References Cited

U.S. PATENT DOCUMENTS

| 4,438,423 A | 3/1984 | Stier |
| 4,604,700 A | 8/1986 | Igarashi et al. |

(Continued)

FOREIGN PATENT DOCUMENTS

| EP | 1930631 B1 | 6/2008 |
| WO | 9827369 A1 | 6/1998 |

(Continued)

OTHER PUBLICATIONS

International Search Report dated Mar. 18, 2016 for application No. PCT/EP2015/077830.

(Continued)

*Primary Examiner* — David J Hlavka

(57) ABSTRACT

A method and apparatus for providing an indication to a driver of a geared vehicle that the vehicle is not in an optimal gear is disclosed. The method comprises determining a current gear of the vehicle and determining a current speed of a drive unit of the vehicle. An indication is then provided to the driver of the vehicle that the vehicle is not in an optimal gear when: (i) the determined current speed of the drive unit is greater than a predetermined threshold; and (ii) the determined current gear of the vehicle is less than a maximum gear of the vehicle. A method and apparatus is also disclosed for determining a score indicative of the (Continued)

amount of time during a journey on a road network that a geared vehicle is driven in an optimal gear.

18 Claims, 8 Drawing Sheets

(51) Int. Cl.
| | |
|---|---|
| B60R 16/023 | (2006.01) |
| B60W 40/09 | (2012.01) |
| G07C 5/00 | (2006.01) |
| G07C 5/08 | (2006.01) |
| B60K 31/00 | (2006.01) |
| F16H 59/44 | (2006.01) |
| F16H 59/46 | (2006.01) |
| F16H 61/02 | (2006.01) |
| B60W 50/14 | (2012.01) |
| B60W 30/18 | (2012.01) |
| G08G 1/01 | (2006.01) |
| G07C 5/02 | (2006.01) |
| G07C 5/06 | (2006.01) |
| G08G 1/0962 | (2006.01) |
| G08G 1/0967 | (2006.01) |
| G08G 1/0968 | (2006.01) |
| G08G 1/052 | (2006.01) |
| F16H 63/42 | (2006.01) |
| B60W 50/00 | (2006.01) |
| F16H 59/70 | (2006.01) |
| F16H 59/36 | (2006.01) |

(52) U.S. Cl.
CPC ...... *B60W 30/18* (2013.01); *B60W 30/18072* (2013.01); *B60W 30/18109* (2013.01); *B60W 30/18136* (2013.01); *B60W 40/09* (2013.01); *B60W 50/14* (2013.01); *F16H 59/44* (2013.01); *F16H 59/46* (2013.01); *F16H 61/0213* (2013.01); *F16H 61/0246* (2013.01); *F16H 63/42* (2013.01); *G01P 1/06* (2013.01); *G07C 5/004* (2013.01); *G07C 5/008* (2013.01); *G07C 5/02* (2013.01); *G07C 5/06* (2013.01); *G07C 5/085* (2013.01); *G07C 5/0816* (2013.01); *G07C 5/0825* (2013.01); *G07C 5/0841* (2013.01); *G08G 1/0112* (2013.01); *G08G 1/0129* (2013.01); *G08G 1/0137* (2013.01); *G08G 1/0141* (2013.01); *G08G 1/052* (2013.01); *G08G 1/0967* (2013.01); *G08G 1/09626* (2013.01); *G08G 1/09685* (2013.01); *G08G 1/096716* (2013.01); *G08G 1/096741* (2013.01); *G08G 1/096775* (2013.01); *G08G 1/096827* (2013.01); *G08G 1/096861* (2013.01); *B60K 2370/172* (2019.05); *B60K 2370/174* (2019.05); *B60W 2030/1809* (2013.01); *B60W 2030/18081* (2013.01); *B60W 2050/0078* (2013.01); *B60W 2510/0623* (2013.01); *B60W 2510/0638* (2013.01); *B60W 2510/0642* (2013.01); *B60W 2510/0647* (2013.01); *B60W 2510/1005* (2013.01); *B60W 2520/10* (2013.01); *B60W 2520/105* (2013.01); *B60W 2530/14* (2013.01); *B60W 2550/14* (2013.01); *B60W 2550/141* (2013.01); *B60W 2550/20* (2013.01); *B60W 2550/402* (2013.01); *B60W 2560/06* (2013.01); *B60W 2710/0655* (2013.01); *B60Y 2300/52* (2013.01); *F16H 59/70* (2013.01); *F16H 2059/366* (2013.01); *F16H 2061/0218* (2013.01); *F16H 2063/426* (2013.01); *G01C 21/3632* (2013.01); *G01C 21/3673* (2013.01); *Y02T 10/76* (2013.01); *Y02T 10/84* (2013.01)

(58) Field of Classification Search
CPC .............. G08G 1/052; G08G 1/0141; G08G 1/096827; G08G 1/0112; G08G 1/09626; G08G 1/096716; G08G 1/096741; G08G 1/096775; G08G 1/09685; G08G 1/096861; G08G 1/0129; G07C 8/085; G07C 5/0825; G07C 5/02; G07C 5/004; G07C 5/0841; G07C 5/06; G07C 5/0816; G07C 5/008; G01P 1/06; F16H 63/42; F16H 61/0246; F16H 61/0213; F16H 59/46; F16H 59/44; F16H 2059/366; F16H 59/70; F16H 2063/426; F16H 2061/0218; G01C 21/3697; G01C 21/3632; G01C 21/3673; B60W 30/18; B60W 50/14; B60W 30/18072; B60W 30/18109; B60W 30/18136; B60W 40/09; B60W 2550/141; B60W 2550/14; B60W 2530/14; B60W 2550/402; B60W 2520/10; B60W 2510/1005; B60W 2510/0647; B60W 2510/0642; B60W 2510/06323; B60W 2050/0078; B60W 2030/1809; B60W 2030/18081; B60W 2710/0655; B60W 2560/06; B60W 2550/20; B60W 2520/105; B60W 2510/0638; B60R 16/0236; Y02T 10/84; Y02T 10/76

See application file for complete search history.

(56) References Cited

U.S. PATENT DOCUMENTS

| | | | |
|---|---|---|---|
| 4,701,852 A | 10/1987 | Ulveland | |
| 7,482,912 B2* | 1/2009 | Ruttiger | F16H 63/42 340/439 |
| 8,798,880 B2* | 8/2014 | Cousins | F16H 63/42 474/110 |
| 8,874,337 B2* | 10/2014 | Cousins | F16H 59/44 701/51 |
| 9,898,928 B1* | 2/2018 | Payne | G08G 1/09626 |
| 2012/0078496 A1* | 3/2012 | Lindhuber | B60K 35/00 701/123 |
| 2012/0143449 A1 | 6/2012 | Chauncey et al. | |
| 2012/0197501 A1* | 8/2012 | Sujan | B60K 23/00 701/51 |
| 2012/0221216 A1 | 8/2012 | Chauncey et al. | |
| 2013/0164712 A1 | 6/2013 | Hunt et al. | |
| 2014/0257653 A1* | 9/2014 | Sato | B60K 6/445 701/55 |
| 2017/0001639 A1* | 1/2017 | Dempsey | B60W 30/146 |
| 2017/0116854 A1* | 4/2017 | Sugawara | G01C 21/3492 |

FOREIGN PATENT DOCUMENTS

| | | |
|---|---|---|
| WO | 2009113967 A1 | 9/2009 |
| WO | 2010059110 A1 | 5/2010 |
| WO | 2014098732 A1 | 6/2014 |

OTHER PUBLICATIONS

Search Report dated Aug. 25, 2015 for GB Application No. 1504227.8.

* cited by examiner

A : current vehicle state data (OBD data and data derived therefrom)

B : over-revving events

C : aggregated events for determining performance indictors

D : statistics based on determined performance indicators

E : report data with determined performance indicators

A : Is the vehicle speed > $T_{S1}$?

B : Is the vehicle fuel rate < $T_{F1}$?

C : Is the vehicle fuel rate > 0 and < $T_{F2}$ AND is the engine speed > 0 and < $T_{E1}$?

| Date / Time | Vehicle | Driving time | Optimal gear | Too high in avg | Start / End location |
|---|---|---|---|---|---|
| 10/01 08:10<br>10/01 09:10 | 364 | 49 min 46 s | 47 min 13 s (94 %) | 399 rpm | ● ▲ |
| 10/01 18:10<br>10/01 18:56 | 364 | 39 min 29 s | 37 min 57 s (96 %) | 353 rpm | ● ▲ |
| 10/02 05:32<br>10/02 05:50 | 364 | 17 min 8 s | 13 min 22 s (78 %) | 680 rpm | ● ▲ |
| 10/02 05:52<br>10/02 06:19 | 364 | 27 min 4 s | 26 min 40 s (98 %) | 517 rpm | ● ▲ |
| 10/02 06:23<br>10/02 10:04 | 364 | 3 h 36 min 30 s | 3 h 26 min 59 s (95 %) | 462 rpm | ● ▲ |
| 10/02 15:25<br>10/02 19:23 | 364 | 3 h 36 min 13 s | 3 h 32 min 24 s (98 %) | 362 rpm | ● ▲ |
| 10/02 19:27<br>10/02 20:20 | 364 | 51 min 9 s | 41 min 45 s (81 %) | 173 rpm | ● ▲ |
| 10/03 07:35<br>10/03 07:51 | 364 | 13 min 42 s | 12 min 32 s (91 %) | 383 rpm | ● ▲ |
| 10/03 07:54 | 364 | 38 min 34 s | 34 min 30 s (89 %) | 429 rpm | ● ▲ |

94.3% in optimal gear (15 h 19 min of 16 h 15 min driving)
380 rpm too high in average

Figure 8

APPARATUS AND METHOD FOR PROVIDING OPTIMAL GEAR ADVICE

CROSS-REFERENCE TO RELATED APPLICATIONS

The present application is a National Stage of International Application No. PCT/EP2015/077830, filed on Nov. 26, 2015, and designating the United States, which claims benefit to United Kingdom Patent Application 1420988.6 filed on Nov. 26, 2014 and United Kingdom Patent Application 1504227.8 filed on Mar. 12, 2015. The entire content of these applications is incorporated herein by reference.

FIELD OF THE INVENTION

The present invention relates to a method and apparatus for evaluating vehicle driving, for example, for provision to a driver of the vehicle and/or to a manager of a fleet of vehicles. For example, the invention can in embodiments determine times at which a driver of a vehicle is not driving in an optimal gear, e.g. based on gear information for the vehicle determined from data collected via the OBD port of the vehicle, and that can lead to reductions in fuel efficiency if not rectified.

BACKGROUND OF THE INVENTION

Increasingly it is desired to improve a fuel economy of vehicles, particularly, although not exclusively, vehicles powered by fossil fuels, such as petrol and diesel. Although it will be realised that improving the fuel economy of any vehicle, including electric, hybrid and hydrogen powered vehicles, for example, is also desired. Some efforts at improving the fuel economy of vehicles are focussed on increasing an efficiency of the vehicle, such as a mechanical and/or electrical efficiency of the vehicle. It has also been realised that the manner in which a vehicle is driven can have a significant impact of the vehicle's economy.

Knowing the current gear and the maximum gear of a vehicle can be useful for various purposes. For example, having this information allows current gear information to be collected or driving behaviour to be monitored. This information also allows the development of methods and systems for monitoring the performance of drivers of vehicles over one or more journeys, and methods and systems for providing feedback to a driver in order to promote more economical driving.

SUMMARY OF THE INVENTION

In accordance with a first aspect of the present invention there is provided a method of providing an indication to a driver of a geared vehicle that the vehicle is not in an optimal gear, comprising:
  determining a current gear of the vehicle;
  determining a current speed of a drive unit of the vehicle; and
  providing an indication to the driver of the vehicle that the vehicle is not in an optimal gear when: (i) the determined current speed of the drive unit is greater than a predetermined threshold; and (ii) the determined current gear of the vehicle is less than a maximum gear of the vehicle.

The present invention extends to an apparatus for carrying out a method in accordance with any of the aspects or embodiments of the invention herein described.

Thus, in accordance with another aspect of the invention there is provided an apparatus for providing an indication to a driver of a geared vehicle that the vehicle is not in an optimal gear, comprising:
  means for determining a current gear of the vehicle;
  means for determining a current speed of a drive unit of the vehicle; and
  means for providing an indication to the driver of the vehicle that the vehicle is not in an optimal gear when: (i) the determined current speed of the drive unit is greater than a predetermined threshold; and (ii) the determined current gear of the vehicle is less than a maximum gear of the vehicle.

Similarly, in accordance with another aspect of the invention there is provided an apparatus for providing an indication to a driver of a geared vehicle that the vehicle is not in an optimal gear, comprising at least one processor and a memory containing instructions that, when executed by the at least one processor, cause the apparatus to:
  determine a current gear of the vehicle;
  determine a current speed of a drive unit of the vehicle; and
  provide an indication to the driver of the vehicle that the vehicle is not in an optimal gear when: (i) the determined current speed of the drive unit is greater than a predetermined threshold; and (ii) the determined current gear of the vehicle is less than a maximum gear of the vehicle.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

Therefore, and as will be appreciated, the present invention requires the determination, or suitable means for making such a determination, of when: (i) the determined current speed of the drive unit is greater than a predetermined threshold; and (ii) the determined current gear of the vehicle is less than a maximum gear of the vehicle.

In embodiments, the predetermined threshold is based on a fuel type used by the drive unit of the vehicle. The fuel type may be one of diesel or petrol. A first predetermined threshold may be used for a petrol drive unit, and a second predetermined threshold may be used for a diesel drive unit, wherein the first predetermined threshold is higher than the second predetermined threshold.

In embodiments, at least one of the current gear of the vehicle and the current speed of the drive unit is received from a remote device.

In embodiments, the determination of the current gear of the vehicle may comprise: receiving a speed-rpm ratio of the vehicle, based on a speed of the vehicle and a corresponding speed of the drive unit of the vehicle; evaluating a difference between the speed-rpm ratio and a speed-rpm ratio from an entry in a gear table, said gear table comprising a plurality of entries, each entry associating an available gear of the geared vehicle with a speed-rpm ratio; and determining that the current gear of the vehicle is the available gear of the entry in the gear table when the difference is within a predetermined threshold. The maximum gear of the vehicle may also be determined from the gear table.

In one example, the gear table may be generated by: receiving a plurality of speed-rpm ratios of the vehicle, each based on a speed of the vehicle and a corresponding speed of a drive unit of the vehicle; assigning each of the plurality of speed-rpm ratios to a relevant one of a plurality of speed-rpm ratio bins in a histogram; thresholding the histogram to identify a plurality of peaks, each peak having an associated speed-rpm ratio; and determining a plurality of available gears as the associated speed-rpm ratios of the plurality of peaks.

In another alternate example, the gear table may be generated by: receiving a plurality of successive speed-rpm ratios of the vehicle, each based on a speed of the vehicle and a corresponding speed of a drive unit of the vehicle; evaluating a consistency measure indicative of a variation in the plurality of successive speed-rpm ratios over time; and determining that the plurality of successive speed-rpm ratios correspond to an available gear when the consistency measure is less than a predetermined threshold. In this example, when the plurality of successive speed-rpm ratios are determined to correspond to an available gear, an entry may be added to the gear table for the available gear based on the plurality of successive speed-rpm ratios. Additionally or alternatively, when the plurality of successive speed-rpm ratios are determined to correspond to an available gear, an existing entry in the gear table for the available gear may be adjusted based on the plurality of successive speed-rpm ratios.

In either example, the method may further comprise: receiving a speed of the drive unit of the vehicle when the vehicle is standing still; storing the received speed of the drive unit as a no-load rpm; and subsequently ignoring at least one of the received speed-rpm ratios of the vehicle if the speed of the drive unit of the vehicle on which at least one speed-rpm ratio is based is within a predetermined threshold of the no-load rpm.

The determination of an available gear of the geared vehicle for use in generating the gear table can be additionally based on an indication of an acceleration state of the vehicle. The indication of the acceleration state of the vehicle can be given by an acceleration signal or a plurality of successive speed signals. The determination of an available gear of the geared vehicle for use in generating the gear table can additionally include a determination of a reverse gear based on an acceleration signal indicative of reverse acceleration following at least one speed signal indicative of the vehicle speed being zero.

In embodiments, the determination that the vehicle is not in an optimal gear can further include: determining a coasting state of the vehicle; and providing an indication to the driver of the vehicle that the vehicle is not in an optimal gear when: (i) the determined current speed of the drive unit is greater than a predetermined threshold; (ii) the determined current gear of the vehicle is less than a maximum gear of the vehicle; and (iii) the determined coasting state of the vehicle indicates the vehicle is not currently coasting.

The determination of the coasting state of the vehicle can be determined based upon at least one of the speed of the drive unit of the vehicle and a fuel usage rate of the drive unit of the vehicle. The coasting state of the vehicle can be determined to be one of: coasting in-gear, coasting in neutral and/or no coasting. The coasting state can be determined based upon a comparison between the fuel usage rate and at least one predetermined threshold fuel usage rate, which may be, or be based on, an idle fuel usage rate of the vehicle. The coasting state can be determined based upon a comparison between the speed of the drive unit and at least one predetermined threshold speed, which may be, or be based on, an idling speed of the drive unit, that is typically determined when the vehicle is stationary.

In embodiments, the provision of an indication to the driver that the vehicle is not in an optimal gear comprises at least one of: displaying a graphical icon on a display device within the vehicle; providing an audio warning to the driver; and providing an a haptic warning to the driver.

The present invention may, in embodiments, further comprise: determining a first time indicative of the total driving time of a journey on road network; determining a second time indicative of the driving time during the journey that the vehicle was not in an optimal gear; and determining a score indicative of the amount of time during the journey that the vehicle was driven in an optimal gear based on the first and second times.

It is believed that the determination of a score in this manner may be new and advantageous in its own right. Thus, in accordance with a further aspect of the invention there is provided a method of determining a score indicative of the amount of time during a journey on a road network that a geared vehicle is driven in an optimal gear, comprising:

determining a first time indicative of the total driving time of the journey;

determining a second time indicative of the driving time during the journey that the vehicle was not in an optimal gear, wherein the vehicle is not in an optimal gear when: (i) a current speed of the drive unit of the vehicle is greater than a predetermined threshold; and (ii) a current gear of the vehicle is less than a maximum gear of the vehicle; and determining a score indicative of the amount of time during the journey that the vehicle was driven in an optimal gear based on the first and second times.

The present invention extends to an apparatus for carrying out a method in accordance with any of the aspects or embodiments of the invention herein described.

Thus, in accordance with another aspect of the invention there is provided an apparatus for determining a score indicative of the amount of time during a journey on a road network that a geared vehicle is driven in an optimal gear, comprising:

means for determining a first time indicative of the total driving time of the journey;

means for determining a second time indicative of the driving time during the journey that the vehicle was not in an optimal gear, wherein the vehicle is not in an optimal gear when: (i) a current speed of the drive unit of the vehicle is greater than a predetermined threshold; and (ii) a current gear of the vehicle is less than a maximum gear of the vehicle; and means for determining a score indicative of the amount of time during the journey that the vehicle was driven in an optimal gear based on the first and second times.

Similarly, in accordance with another aspect of the invention there is provided an apparatus for determining a score indicative of the amount of time during a journey on a road network that a geared vehicle is driven in an optimal gear, comprising at least one processor and a memory containing instructions that, when executed by the at least one processor, cause the apparatus to:

determine a first time indicative of the total driving time of the journey;

determine a second time indicative of the driving time during the journey that the vehicle was not in an optimal gear, wherein the vehicle is not in an optimal gear when: (i) a current speed of the drive unit of the vehicle is greater than a predetermined threshold; and (ii) a current gear of the vehicle is less than a maximum gear of the vehicle; and determine a score indicative of the amount of time during the journey that the vehicle was driven in an optimal gear based on the first and second times.

As will be appreciated by those skilled in the art, this further aspect of the present invention can and preferably does include any one or more or all of the preferred and optional features of the invention described herein in respect of any of the other aspects of the invention, as appropriate. If not explicitly stated, the system of the present invention herein may comprise means for carrying out any step described in relation to the method of the invention in any of its aspects or embodiments, and vice versa.

In embodiments, the determination of the score is based on a ratio of the second time to the first time. The invention may further comprise at least one of: displaying a representation of the score on a display device within the vehicle; and transmitting the determined score for display on a remote device.

The apparatus that performs the invention, in accordance with any of its aspects and embodiments, is a vehicle tracking device, a portable navigation device or a navigation device integrated into the vehicle. The apparatus may comprise a receiver, which may be a wireless receiver, to receive at least one of the current gear of the vehicle and the current speed of the drive unit from a remote device coupled to an on-board diagnostics (OBD) port of the vehicle.

Methods in accordance with the present invention may be implemented at least partially using software, e.g. computer programs. The present invention thus also extends to a computer program comprising computer readable instructions executable to perform a method according to any of the embodiments of the invention.

The invention thus also extends to a computer software carrier comprising software which when used to operate a system or apparatus comprising data processing means causes, in conjunction with said data processing means, said apparatus or system to carry out the steps of a method in accordance with embodiments of the present invention. Such a computer software carrier could be a non-transitory physical storage medium, such as a ROM chip, CD ROM or disk, or could be a signal, such as an electronic signal over wires, an optical signal or a radio signal such as to a satellite or the like.

The present invention in accordance with any of its further aspects or embodiments may include any of the features described in reference to other aspects or embodiments of the invention to the extent it is not mutually inconsistent therewith.

Advantages of these embodiments are set out hereafter, and further details and features of each of these embodiments are defined in the accompanying dependent claims and elsewhere in the following detailed description.

BRIEF DESCRIPTION OF THE DRAWINGS

Some preferred embodiments of the present invention will now be described, by way of example only, and with reference to the accompanying drawings, in which:

FIG. 8 is an illustration of an exemplary report as viewable on the computer of the fleet manager showing the over-revving performance metric for a plurality of trips made by a vehicle or driver.

DETAILED DESCRIPTION OF THE PREFERRED EMBODIMENTS

Embodiments of the invention are directed to methods and systems for monitoring the performance of drivers of vehicles over one or more journeys, and methods and systems for providing feedback to a driver in order to promote more economical driving.

Figure 1:
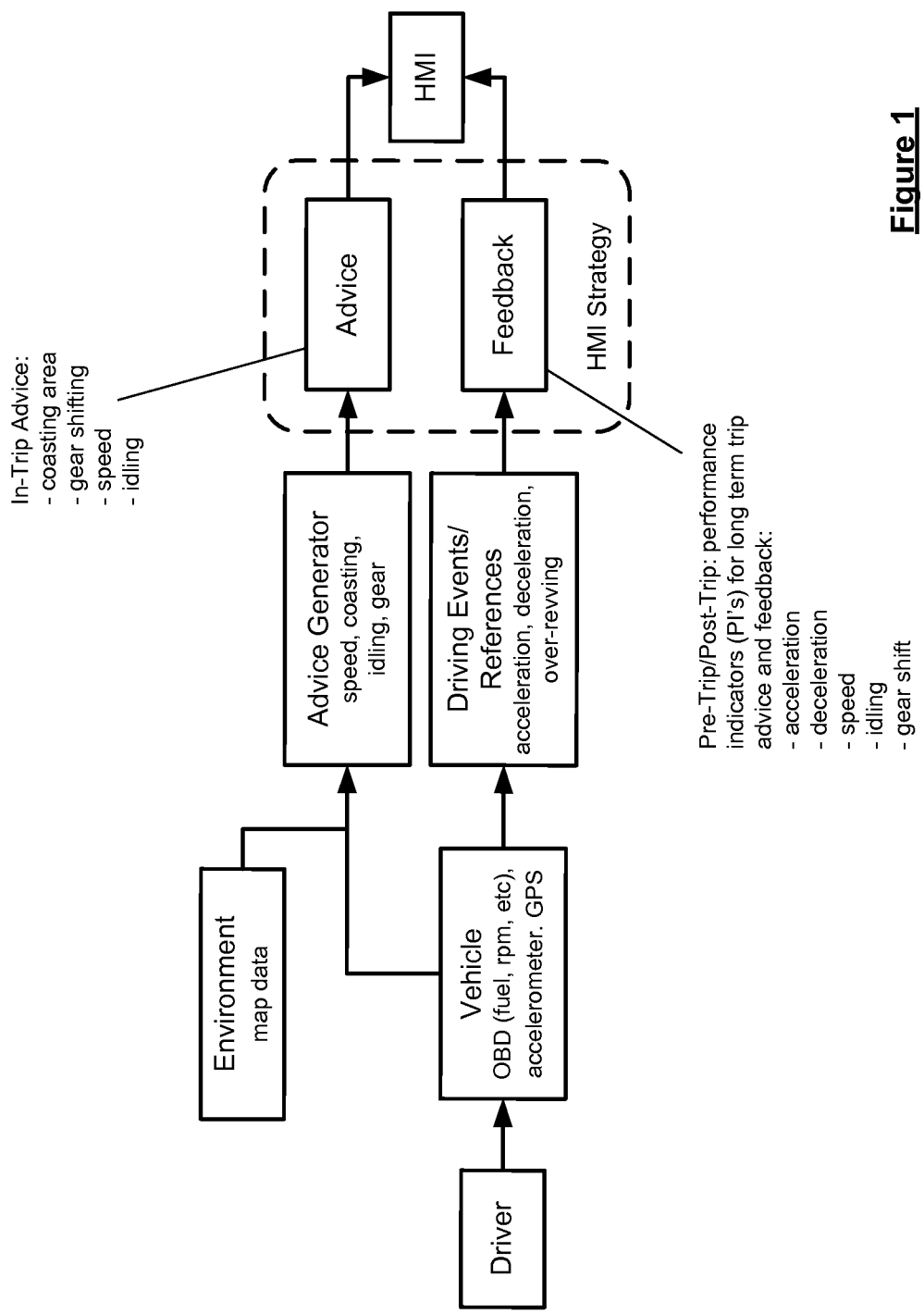
FIG. 1 is an illustration of a system for providing driver feedback.

An system for proving driver feedback is shown in FIG. 1. As shown in FIG. 1, the driver feedback comprises two components: feedback on current or historic driving performance (to be studied by the driver before beginning a trip or after having completed a trip); and advice on how driving styles can be modified to achieve more economical driving (which is typically given during a trip). The advice may comprise advice on an optimal or "green" speed to achieve maximum economical results; times/areas when "coasting" is possible; gear choice and when to change gear; etc. The feedback may comprise counts of events with harsh acceleration or declaration, speeding events (with respect to the speed limit and/or green speed), inefficient gear changes (over-revving), etc. The feedback may also comprise indicators as to how current and/or historic driving performance equates to predetermined goals, which may be set by the driver or may be set remotely by a fleet manager.

The invention is directed to the generation of a new performance indicator for use in providing driver feedback, and to methods for determining data for use in the generation of such a performance indicator. A summary of the each of the aspects of the invention is given below:

The determination of a list of available gears in a geared vehicle, including a vehicle's highest (or maximum) gear, using vehicle speed and engine speed (rpm) values obtainable, for example, over a vehicle's on-board diagnostics (OBD) port The use of the determined list of available gears, together with current vehicle speed and engine speed values obtained, e.g. from the vehicle's OBD port, to determine a current gear The determination of whether a driver is coasting with braking or coasting without braking, based on the use of a vehicle's fuel rate and engine speed to detect whether the vehicle is coasting, either 'coasting in gear' or 'coasting in neutral'

The determination of an over-revving metric (or performance indicator) based on the amount of the time driven, in relation to the total driving time of the trip, when the engine speed is too high and the vehicle is not in the highest (or maximum gear). This over-revving metric can also be referred to as a score indicating the amount of time during a journey on a road network that a geared vehicle is driven in an optimal gear System Architecture The vehicle may be of any type of vehicle including a conventional (fossil fuel) powered vehicle, e.g. petrol or diesel, a hybrid vehicle, a hydrogen powered vehicle, a fuel cell powered vehicle or an electric vehicle. Embodiments of the invention will be described with reference to a vehicle having an engine (or drive unit) operative at an engine speed and fuel being supplied to the engine (or being consumed by the engine) at a fuel rate. It will, however, be realised that these terms may be construed accordingly to encompass the aforementioned types of vehicles.

Figure 2:
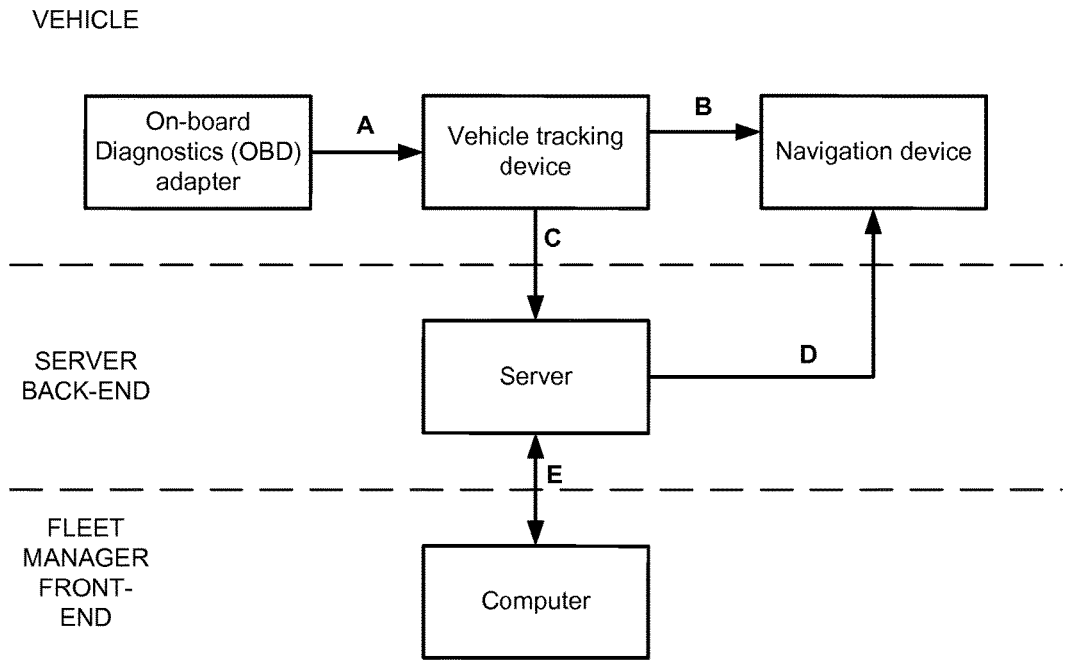
FIG. 2 is an illustration of a system according to an embodiment of the present invention.

The system of the invention is exemplified by FIG. 2 in which the vehicle can include: an on-board diagnostics (OBD) adapter; a vehicle tracking device; and a navigation device. The vehicle tracking device can be arranged to communicate with a server, which in turn is arranged to communicate with the navigation device in the vehicle and a computer, such as in the base of operations of the fleet manager. While the system the system shows three distinct devices in the vehicle: the OBD adapter; the vehicle tracking device and the navigation device, it will be appreciated that the vehicular components of the system can be shared between a greater number or a fewer number of devices as desired. Similarly, while FIG. 2 shows data being transmitted to the server only from the vehicle tracking device, in other embodiments data can be sent to the server from any of the vehicular devices as desired. The functionality of each of the components shown in FIG. 2 will now be described in more detail.

OBD Adapter:

The adapter device comprises an interface unit for communicating with one or more systems of the vehicle. The interface unit may be removably coupleable to an OBD port of the vehicle to receive data indicative of one or more parameters associated with the vehicle. The OBD port provides the one or more parameters to the interface unit from a communication bus of the vehicle. It will be realised, however, that the interface unit may communicate with the vehicle via other connections such as a via a wireless connection. The adapter device is therefore preferably configured to collect data from the OBD port in the vehicle, such as engine speed (rpm), vehicle speed, and to determine other information derived from such OBD data, such as the current gear, maximum gear, fuel consumption, etc, and to deliver the data to the vehicle tracking device. In other words, the data transmitted, in a wired and/or wireless manner, to the vehicle tracking device is indicative of a current state of the vehicle. It will be appreciated, however, that the speed of the vehicle may be determined in other ways, such as via received wireless location determining signals.

Vehicle Tracking Device:

The tracking device comprises a position determining device, such as a global navigation satellite system (GNSS) receiver, e.g. GPS or GLONASS. It will be appreciated, however, that other means may be used, such as using the mobile telecommunications network, surface beacons or the like. The positioning determining device generates tracking data, such as time-stamped positions, indicative of the change in position of the device over time. The tracking device further comprises one or more communication devices that are arranged to communicate with the OBD adapter, the navigation device and the server, either using a wired or wireless connection. The one or more communication devices can comprise a short range wireless transceiver, such as a Bluetooth transceiver, e.g. for communicating with the OBD adapter and the navigation device, and can comprise a mobile telecommunications transceiver, such as a GPRS or GSM transceiver, e.g. for communicating with the server. The tracking device further comprises at least one processor arranged to aggregate certain data for use in the subsequent generation of certain performance indicators (as discussed in more detail below), e.g. an over-revving performance indicator. For over-revving, the tracking device monitors the engine speed (obtained from the OBD adapter) and generates over-revving events.

Navigation Device:

The navigation device comprises at least one processor and a display device. The navigation device may be capable of one or more of: calculating a route to be travelled to a desired destination; and providing navigation instructions to guide the driver along a calculated route to reach a desired destination. The at least one processor is arranged to cause performance indicators (e.g. obtained from the server) to be displayed on the display device, e.g. before, during and/or after a trip. The at least one processor can be further arranged to display indicators on the display device, such as an indicator to change up in gear, e.g. if it is determined that the vehicle is not currently in the maximum gear.

Server:

The server comprises at least one processor and a communications device for communicating with one of more of the vehicular devices, preferably the vehicle tracking device. The at least one processor is arranged to calculate at least one performance indicator, e.g. the over-revving indicator, for a trip.

Computer:

The computer is in communication with the server, and is used by a fleet manager to review the performance of the drivers of their fleet of vehicles based on the determined performance indicators.

Gear Detection

According to embodiments of the invention, there is provided methods and systems of determining gears of geared vehicle using vehicle speed and engine speed ratios of the vehicle, e.g. obtained over the OBD port of the vehicle using the OBD adapter device. The engine speed is typically represented using the unit rpm (revolutions per minute), which is a measure of the frequency of rotation of the engine. In standard gearboxes the rpm-speed ratios are expected to be constant for each gear, and thus having a list of all ratios would allow a currently engaged gear to be determined using a currently determined rpm-speed ratio.

Figure 3:
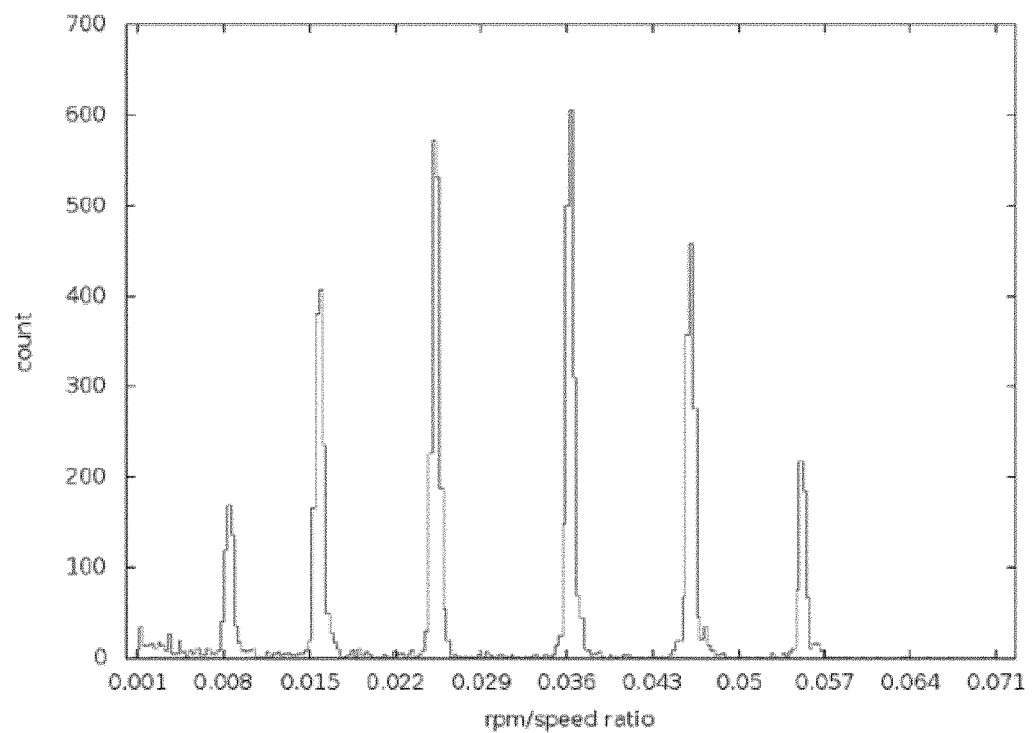
FIG. 3 is an illustration of a histogram that is generated according to an embodiment of the first aspect of the present invention.

A first embodiment uses a histogram based approach. In this embodiment, each of a plurality of speed-rpm ratios is assigned to an appropriate speed-rpm ratio bin (from among a plurality of speed-rpm ratio bins) to generate a histogram. A thresholding process can be applied to the histogram to identify a plurality of peaks, each peak being a speed-rpm ratio that relates to an engaged gear of the vehicle. These identified peaks can then be added to a gear table that has a plurality of entries, each entry being associated with an available gear of the vehicle and the speed-rpm ratio determined from the peak. An example of a histogram that is generated according to this embodiment is shown in FIG. 3. An advantage of this embodiment is that a currently engaged gear can be determined from a single sampled rpm-speed value. However, for example, some gears of the vehicle, e.g. reverse gear or first gear, may be rarely used and can be hard to identify. The method can also be difficult to implement if used in an OBD adapter (or other embedded device) which often has limited computer memory and processing resources, since the histogram table can be relatively large (depending on its level of granularity).

A second embodiment uses a continuous adaptation approach. In this embodiment, a plurality of successive speed-rpm ratios are obtained, and a determination made of a consistency measure indicative of a variation in the plurality of ratios. If consistency measure is within a predetermined limit, i.e. the successive ratios are effectively constant, then the observed 'constant' ratio can be said to be a result of a gear being engaged. A ratio found this way can be added as a new entry to a pre-existing gear table, or if similar to an existing entry used to fine-tune the speed-rpm ratio associated with the appropriate gear. Advantages of this embodiment are that the method is less impacted by noise often found in the data obtained from the OBD port, since the method is analysing relatively small sets of successive samples. Furthermore, the method requires less computational memory and processing resources in comparison to the first embodiment, and thus can be implemented more easily in an OBD adapter (or other embedded device).

Figure 4:
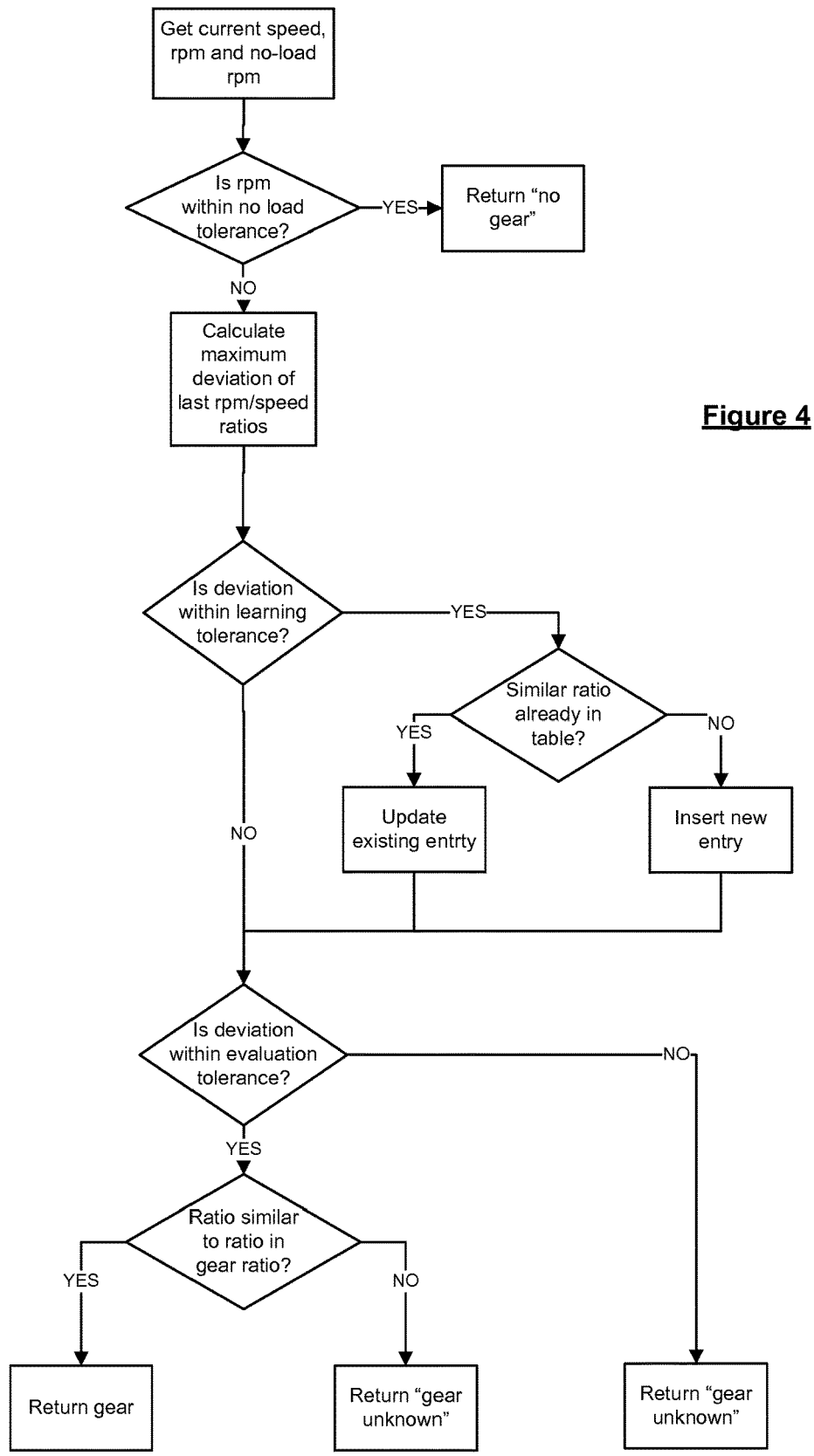
FIG. 4 is a flowchart showing an exemplary implementation of a gear detection algorithm according to an embodiment of the second aspect of the present invention.

An exemplary detailed implementation a gear detection algorithm according to the second embodiment is shown in FIG. 4. In this implementation the gear table is updated whenever the rpm-speed ratio is constant within a certain tolerance for a certain amount of samples. The current gear is returned whenever the rpm-speed ratio is constant with a certain (e.g. less strict) tolerance for a certain amount of samples. In this embodiment, gear ratios need to be detected multiple times to be considered stable. Unstable gear ratios are not taken into account when returning the current gear. A cyclic clean-up is used to remove unstable gear ratios.

Other improvements to the method of the second embodiment to ensure the gear table is accurate can include the use of:
  acceleration data from one or more accelerometers, since acceleration in a forward direction makes it more likely that a gear is engaged;
  other data from the OBD port, such as engine load, pedal position, etc
  speed data, since an increase in speed is again indicative that a gear is engaged.

Figure 5:
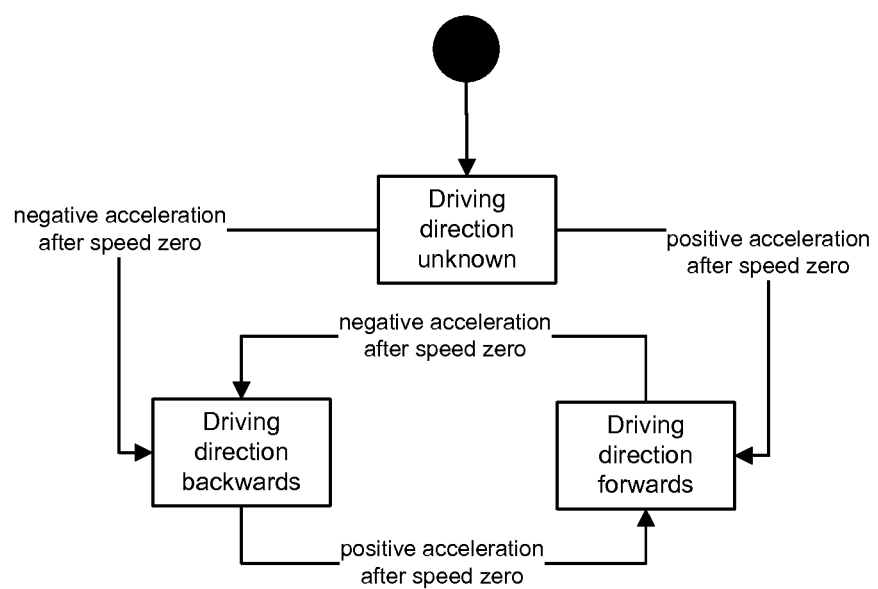
FIG. 5 is a flowchart showing an exemplary implementation of a reverse gear detection algorithm according to an embodiment of the present invention.

As will be appreciated, the method of the second embodiment exemplified in FIG. 4 does not allow for the accurate detection of the reverse gear. This is because the reverse gear is typically only engaged for a short period of time. Although it can, in some instances, be mistakenly identified as an additional gear between gear 1 and gear 2, which can cause inaccuracies when detecting the current gear. A method of accurately detecting the reverse gear can use acceleration data and speed data, e.g. as shown in FIG. 5. In this embodiment, a driving direction of the vehicle can be determined by identifying whether there is positive or negative acceleration after a period of zero speed; a positive acceleration indicating a forwards driving direction, and a negative acceleration indicating a backwards driving direction.

Thus, the invention encompasses a method of determining a current gear of a geared vehicle. The method can comprise receiving a speed-rpm ratio of the vehicle based on a speed of the vehicle and a corresponding rpm of a drive unit of the vehicle, e.g. using an OBD adapter connected to the OBD port of the vehicle. A difference is preferably calculated between the speed-rpm ratio and an available speed-rpm ratio corresponding to a predetermined available gear of the vehicle. A determination is preferably made that the speed-rpm ratio corresponds to an available gear if the difference is within a predetermined tolerance limit; this available gear then being assigned as the current gear. The predetermined available gears are taken from a gear table created in accordance with one of the first and second methods described above.

Coasting

According to embodiments of the invention, there is provided methods and systems for determining whether a driver of a vehicle is coasting during a trip. The term "coasting" in this instance means that the driver has lifted their foot off the accelerator (or gas pedal) to reduce the vehicle speed, such that the vehicle is allowed to naturally decelerate or to roll without being under power. In this way, a fuel economy of the vehicle may be improved.

The detection of coasting is preferably based at least on fuel rate and engine speed, e.g. as obtained by the OBD adapter. Optionally, the detection of coasting is further based on the vehicle speed. For example, coasting may only be detected when the vehicle speed is above a predetermined threshold, such as 20 km/h.

In embodiments, the fuel rate when idling (the "idling rate") and the engine speed when idling (the "idling rpm") is determined for a vehicle, and these values are used to detect periods of coasting by the vehicle. The idling rate and idling rpm are preferably regularly updated at periods of standstill, e.g. each time the vehicle is stopped for a predetermined period of time with the engine running, such that the values reflect the current status of the vehicle. For example, the values may change over time based on the maintenance status of the vehicle.

Figure 6:
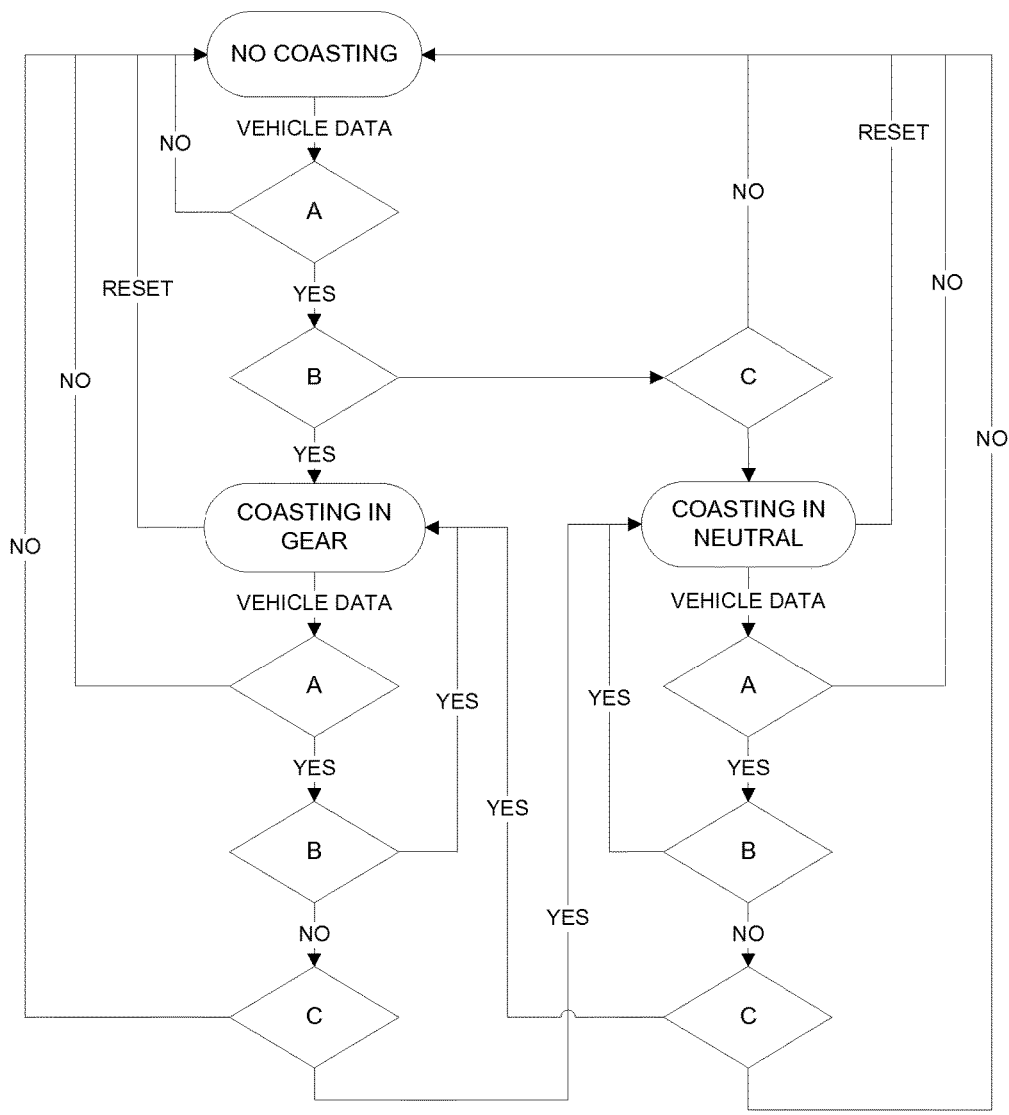
FIG. 6 is a flowchart showing an exemplary method for determining the coasting state of the vehicle.

In embodiments, a determination is continuously made during a trip by a vehicle as to whether the vehicle is in one of the following states: "no coasting"; "coasting in gear"; or "coasting in neutral". An exemplary method for determining the state of the vehicle is shown in FIG. 6, and uses as inputs: the current speed of the vehicle; the current fuel rate of the vehicle; and the current engine speed of the vehicle. The threshold values $T_{S1}$, $T_{F1}$, $T_{F2}$ and $T_{E1}$ are all predetermined. The thresholds $T_{F1}$ and $T_{F2}$ are each based on the determined idling rate for the vehicle; $T_{F1}$ typically be a less than the idling rate, while $T_{F2}$ is typically more the idling rate. Similarly, the threshold $T_{E1}$ is based on the determined idling rpm for the vehicle; $T_{E1}$ typically being more than the idling rpm. The method of FIG. 6 is based on the assumptions that the driver will not press the accelerator (or gas pedal) when coasting and that coasting can be performed with an inserted gear or when in neutral.

Over-Revving Performance Indicator

The over-revving performance indicator is based on the recognition that, in general, fuel consumption of a vehicle is reduced by keeping the engine speed as low as possible during a trip. Accordingly, a driver should ideally shift up to a higher gear early in order to keep the engine speed low and to prevent high-revving.

In embodiments, the performance indicator is based on the relative time of high-revving during a trip to the "real" driving time (i.e. the time at which the vehicle is not standing still). As will be discussed in more detail below, high-revving is defined as times when the engine speed exceeds a predetermined threshold and/or when the vehicle is not using the highest (or maximum) gear, e.g. determined by the OBD adapter using one of the methods described above. The predetermined threshold can be based on the type of fuel used by the vehicle, e.g. with a different threshold used for a petrol (or gasoline) engine than for a diesel engine. Optionally, periods of high-revving are additionally based on times when the vehicle is not coasting. In embodiments, the determination of high-revving is made on the vehicle tracking device based on data received from the OBD adapter, e.g. engine speed, current gear, maximum gear, etc.

Figure 7:
FIG. 7 shows an exemplary display of a navigation device indicating a shift-up advice following a determination that the driver is not in the optimal gear.

In embodiments, a shift up advice can be shown on the display of the navigation device to inform the driver that they should change to a higher gear. Such an advice can be displayed when a period of high-revving, e.g. as defined above, is detected. In embodiments, the determination of high-revving that triggers the display of the shift up advice is made on the vehicle tracking device, and a message sent to the navigation display to display the advice. An example of a graphical icon that can be shown to the driver when it is determined that the vehicle is not in an optimal gear can be seen in FIG. 7. The graphical icon 70 will be shown, either until the message is cancelled by the driver touching the region 74, or until it is detected that the driver has followed the advice and is now travelling in the optimal gear. An icon 72 showing a representation of the total driving score of the driver is also displayed on the device.

An exemplary description of the manner by which high-revving is detected is as follows:

Input:
  engine speed, n
  current gear, cg
  maximum gear, mg
  fuel type, fuel_type
  stand still state, stand_still
  coasting state, coasting
Output:
  driving time, dt
  high-revving time, hrt
Algorithm:
  the driving time dt is calculated by summing the time at which stand_still is false
  the high-revving time hrt is calculated by summing the time at which: cg<mg; n>N, wherein N is a threshold based on fuel_type; and coasting is false The over-revving performance indicator is calculated based on the determined values of driving time dt and high-revving time hrt.

An exemplary report as viewable on the computer of the fleet manager showing the over-revving performance metric for a plurality of trips made by a vehicle or driver is shown in FIG. 8. For example, in one journey on 1 October between 08h10 and 09h10 (total journey time of 49 minutes and 46 seconds), the driver drove in the optimal gear for 47 minutes and 13 seconds. Therefore the driver has achieved a score of 94% for that particular journey. The report also shows that during the times at which the driver was not in the optimal gear, then the engine speed, i.e. the speed of the vehicle drive unit, was on average 399 rom too high. The report also shows an overall score for the driver across all journeys of 6.7, wherein the driver has driven in the optimal gear for 94.3% of all journeys and, when not in optimal gear, was on average 380 rpm too high.

Any of the methods in accordance with the invention as described above may be implemented at least partially using software, e.g. computer programs. The present invention thus also extends to a computer program comprising computer readable instructions executable to perform, or to cause a computing device, e.g. OBD adapter, vehicle tracking device, navigation device, server, etc, to perform, a method according to any of the above described aspects or embodiments of the invention. The invention correspondingly extends to a computer software carrier comprising such software which, when used to operate a system or apparatus comprising data processing means causes, in conjunction with said data processing means, said apparatus or system to carry out the steps of the methods of the present invention. Such a computer software carrier could be a non-transitory physical storage medium such as a ROM chip, CD ROM or disk, or could be a signal such as an electronic signal over wires, an optical signal or a radio signal such as to a satellite or the like. The present invention provides a machine readable medium containing instructions which when read by a machine cause the machine to operate according to the method of any of the aspects or embodiments of the invention.

The invention claimed is:

1. A method of providing an indication to a driver of a geared vehicle that the vehicle is not in an optimal gear, comprising:
   determining a current gear of the vehicle;
   determining a current speed of a drive unit of the vehicle;
   determining a coasting state of the vehicle; and
   providing the indication to the driver of the vehicle that the vehicle is not in the optimal gear when: (i) the current speed of the drive unit is greater than a predetermined threshold; (ii) the current gear of the vehicle is less than a maximum gear of the vehicle; and (iii) the coasting state of the vehicle indicates the vehicle is not currently coasting, wherein the coasting state of the vehicle is determined based upon at least one of the current speed of the drive unit of the vehicle and a fuel usage rate of the drive unit of the vehicle.

2. The method of claim 1, wherein the predetermined threshold is based on a fuel type used by the drive unit of the vehicle.

3. The method of claim 2, wherein the fuel type is one of diesel or petrol.

4. The method of claim 3, wherein a first predetermined threshold is used for a petrol drive unit, and a second predetermined threshold is used for a diesel drive unit, and wherein the first predetermined threshold is higher than the second predetermined threshold.

5. The method of claim 1, wherein at least one of the current gear of the vehicle and the current speed of the drive unit is received from a remote device.

6. The method of claim 1, wherein the determination of the current gear of the vehicle comprises:
   receiving a speed-rpm ratio of the vehicle, the speed-rpm ratio being based on a speed of the vehicle and a corresponding current speed of the drive unit of the vehicle;
   evaluating a difference between the speed-rpm ratio and a speed-rpm ratio from an entry in a gear table from among a plurality of entries in the gear table, each entry of the plurality of entries in the gear table associating a separate available gear of the geared vehicle with a speed-rpm ratio; and
   determining that the current gear of the vehicle is the available gear of the entry in the gear table when the difference is within a predetermined difference threshold.

7. The method of claim 6, wherein the maximum gear of the vehicle is determined from the gear table.

8. The method of claim 1, wherein providing the indication to the driver that the vehicle is not in the optimal gear comprises at least one of: displaying a graphical icon on a display device within the vehicle; providing an audio warning to the driver; and providing a haptic warning to the driver.

9. The method of claim 1, further comprising:
- determining a first time indicative of the total driving time of a journey on road network;
- determining a second time indicative of the driving time during the journey that the vehicle was not in the optimal gear; and
- determining a score indicative of the amount of time during the journey that the vehicle was driven in the optimal gear based on the first and second times.

10. A method of determining a score indicative of the amount of time during a journey on a road network that a geared vehicle is driven in an optimal gear, comprising:
- determining a first time indicative of the total driving time of the journey;
- determining a second time indicative of the driving time during the journey that the vehicle was not in the optimal gear, wherein the vehicle is not in the optimal gear when: (i) a current speed of the drive unit of the vehicle is greater than a predetermined threshold; (ii) a current gear of the vehicle is less than a maximum gear of the vehicle; and (iii) the vehicle is not currently in a coasting state; and
- determining the score indicative of the amount of time during the journey that the vehicle was driven in the optimal gear based on the first and second times.

11. The method of claim 10, wherein the determination of the score is based on a ratio of the second time to the first time.

12. The method of claim 10, comprising at least one of: displaying a representation of the score on a display device within the vehicle; and transmitting the score for display on a remote device.

13. An apparatus for providing an indication to a driver of a geared vehicle that the vehicle is not in an optimal gear, comprising at least one processor and a memory containing instructions that, when executed by the at least one processor, cause the apparatus to:
- determine a current gear of the vehicle;
- determine a current speed of a drive unit of the vehicle;
- determine a coasting state of the vehicle; and
- provide the indication to the driver of the vehicle that the vehicle is not in the optimal gear when:
- (i) the current speed of the drive unit is greater than a predetermined threshold; (ii) the current gear of the vehicle is less than a maximum gear of the vehicle; and (iii) the coasting state of the vehicle indicates the vehicle is not currently coasting, wherein the coasting state of the vehicle is determined based upon at least one of the current speed of the drive unit of the vehicle and a fuel usage rate of the drive unit of the vehicle.

14. The apparatus of claim 13, wherein the apparatus is a vehicle tracking device or a portable navigation device.

15. The apparatus of claim 13, comprising a receiver, optionally a wireless receiver, to receive at least one of the current gear of the vehicle and the current speed of the drive unit from a remote device coupled to an on-board diagnostics (OBD) port of the vehicle.

16. An apparatus for determining a score indicative of an amount of time during a journey on a road network that a geared vehicle is driven in an optimal gear, comprising at least one processor and a memory containing instructions that, when executed by the at least one processor, cause the apparatus to:
- determine a first time indicative of a total driving time of the journey;
- determine a second time indicative of a driving time during the journey that the vehicle was not in the optimal gear, wherein the vehicle is not in the optimal gear when: (i) a current speed of the drive unit of the vehicle is greater than a predetermined threshold; (ii) a current gear of the vehicle is less than a maximum gear of the vehicle; and (iii) the vehicle is not currently in a coasting state; and
- determine the score indicative of the amount of time during the journey that the vehicle was driven in the optimal gear based on the first and second times.

17. A non-transitory computer-readable storage medium storing instructions which, when executed by at least one processor of an apparatus comprising at least one processor, cause the apparatus to perform a method for providing an indication to a driver of a geared vehicle that the vehicle is not in an optimal gear, the method comprising:
- determining a current gear of the vehicle;
- determining a current speed of a drive unit of the vehicle;
- determining a coasting state of the vehicle; and
- providing the indication to the driver of the vehicle that the vehicle is not in an optimal gear when: (i) the current speed of the drive unit is greater than a predetermined threshold; (ii) the current gear of the vehicle is less than a maximum gear of the vehicle; and (iii) the coasting state of the vehicle indicates the vehicle is not currently coasting, wherein the coasting state of the vehicle is determined based upon at least one of the current speed of the drive unit of the vehicle and a fuel usage rate of the drive unit of the vehicle.

18. The non-transitory computer-readable storage medium of claim 17, wherein determining the current gear of the vehicle comprises:
- receiving a speed-rpm ratio of the vehicle, the speed-rpm ratio being based on a speed of the vehicle and a corresponding current speed of the drive unit of the vehicle;
- evaluating a difference between the speed-rpm ratio and a speed-rpm ratio from an entry in a gear table from among a plurality of entries in the gear table, each entry of the plurality of entries in the gear table associating a separate available gear of the geared vehicle with a speed-rpm ratio; and
- determining that the current gear of the vehicle is the available gear of the entry in the gear table when the difference is within a predetermined threshold.

* * * * *